United States Patent Office 3,455,732
Patented July 15, 1969

3,455,732
HEAT-RESISTANT SILICONE RESIN COATING
Clayton E. Hathaway, Jr., Kettering, Ohio, assignor to Monsanto Research Corporation, St. Louis, Mo., a corporation of Delaware
No Drawing. Filed Dec. 21, 1965, Ser. No. 515,472
Int. Cl. B44d 1/36, 1/34
U.S. Cl. 117—132                              9 Claims

ABSTRACT OF THE DISCLOSURE

An in situ formed coating prepared by curing a mixture of a silicone polymer, colloidal fibrous alumina and titanium dioxide at 370–550° C. on a solid metallic substrate.

---

This invention relates to coated materials which are serviceable at elevated temperatures and more particularly provides a new and valuable heat-resistant protective coating and the method of preparing the same.

In the manufacture of modern aircraft there is need for tough finishes having extraordinary heat stability and tenacious adherence to surfaces such as those presented by metal sheetings and glass. Generally, coatings having an organic polymer base do not possess the desired thermal properties, even when there are employed such expedients as hardening in the presence of cross-linking agents and/or introducing an inorganic moiety into the polymer structure. Although ceramic coatings are often employed on metals which require protection against oxidation at high temperatures, the preparation of such coatings requires firing temperatures which are generally much higher than those to which the coated article will need to be subjected during use.

An object of this invention is to provide a stable, fluid coating composition which can be applied to surfaces to form a film of substantial thickness which adheres tenaciously to the substrate, withstands elevated temperatures, and presents a tough, hard surface of pleasing appearance. Another object is the provision of thermally stable protective coatings for metals. Still another object is the provision of a liquid coating composition which dries and adheres to the substrate at comparatively low temperatures and which can be converted to a tough, tenacious, thermally resistant coating by subsequent heating.

These and other objects hereinafter defined are provided by the process which comprises substantially uniformly applying to the surface of a refractory substrate a fluid composition consisting essentially of a mixture of a silicone polymer consisting essentially of groups represented by the formula:

in which R is selected from the class consisting of hydrogen and hydrocarbon radicals of 1 to 8 carbon atoms and wherein no more than about 60% of the R radicals are hydrogen and $x$ is a number of from 1.0 to 1.80, an inert, organic, liquid solvent for said polymer, and a filler in a quantity which is from 150% to 850% by weight of the polymer and which consists essentially of a finely comminuted mixture of colloidal fibrous alumina and titanium dioxide consisting by weight of from 15% to 60% of the alumina with the balance being titanium dioxide, evaporating off said diluent from said composition, and heating the composition remaining to above 370° C. and below 550° C. to decrease the weight of the remaining composition by from 10 to 30% and to obtain upon the substrate a strongly adherent in situ formed coating.

More particularly, the invention provides the process of applying to a metal substrate a composition consisting essentially of said silicone and said filler in a weight ratio of from 1.0:1.5 to 8.5:1.0, said filler consisting of the alumina and the titanium dioxide in a weight ratio of from 1:4 to 3:2, in an inert, volatilizable solvent for the silicone, allowing the composition to dry, curing the dried composition upon the substrate thereon by gradually heating at up to 500° C. and then aging the composition upon the substrate by heating at from 500° C. to 550° C. to obtain upon the substrate a strongly adherent in situ formed coating which can be reheated to the aging temperature without substantial decomposition.

Silicones of the above formula are generally resinous materials which are soluble in alcohols and aliphatic and aromatic hydrocarbons and other volatilizable solvents which are commonly used in the coatings industry. Solutions of such silicones have been generally applied as coatings on metal surfaces to give adherent films. However, upon long exposure to high temperatures, i.e., temperatures in the range of 400–500° C., they undergo considerable decomposition. The aged film may continue to adhere, it decreases in weight and hence in thickness, and may shrink sufficiently to cause cracking and flaking.

We have found that the usefulness of the above defined silicones for the manufacture of thermally resistant coatings is significanty increased by the presently provided process. A solution of the silicone is simply incorporated with the quantities of fibrous colloidal alumina and titanium dioxide set forth above; the resulting composition is applied to the substrate to be coated, e.g., by spraying, brushing, casting or trowelling; the solvent is volatilized off; and the dried composition is heated upon the substrate at above the temperatures which are generally used for curing the silicones.

Although we do not know the nature of the reaction which takes place upon heating said mixture at the very high temperature, it is possible that reaction between the filler particles and between the particles of a silicone residue thereof results. This possibility is supported by the fact that the filler particles are so firmly bonded to each other and to the substrate that thicker, hard, thermally stable coatings are obtained by the present process than those that can be obtained with lower quantities of the same filler or with different ratios of the filler constituents.

The presently provided coatings are generally light gray, to white, tightly adherent, thick and hard, continuous films which can be repeatedly heated to the processing temperature, i.e., at 370° C. to 550° C. without substantial degradation. Coatings as thick as 1 to 2 mils prepared from the same silicone with less than the specified amounts of the presently employed mixture of fillers and cured at below 370° C. cannot be heated to 500° C. without extension degradation of coating properties. The generally recommended maximum curing temperature for the silicone resins is of the order of 260°–287° C. (500°–550° F.). Employing the proportions of titanium dioxide and alumina required by the present invention permits the production of a coating having a thickness of up to 2 mils or more and heating of said coating up to about 550° C. (ca 1025° F.) without breakdown of the coating. Although in some cases, depending upon the hydrocarbon content of the silicone, there may be as great as a 30% loss in weight, there remains sufficient residue for binding the filler particles together and to the substrate; and the presence of both the titanium oxide and the alumina provides for the build-up of a skeleton structure which withstands the weight loss without cracking and flaking. Silicones having aromatic hydrocarbon substitution undergo the greater weight loss as compared to those in which only lower alkyl substitution is present. This indicates degradation at the hydrocarbon portion of the silicone. However, irrespective of the reason for the weight loss, during the heating the residue unites in some manner with the present filler to give the presently provided, vastly superior, in situ formed coating.

The silicones with which the present invention is concerned are well known in the art; see, for example, Howard W. Post, "Silicones and Organic Silicon Compounds," Reinhold Publishing Co., New York, 1949; R. N. Meals and T. M. Lewis, "Silicones," Reinhold Publishing Co., New York, 1959; and R. R. McGregor, "Silicones and Their Uses," McGraw-Hill Book Co., New York, 1954. Early descriptions thereof are found in U.S. Patent Nos. 2,258,218–222 of Eugene G. Rochow. Thus in U.S. Patent No. 2,258,218, polymeric methyl silicone is stated to be a polymer having in its molecule an average of from approximately one to approximately two methyl groups for each silicone atom. In U.S. Patent No. 2,258,220, the ethyl containing resin is stated to correspond to the formula $$(C_2H_5)_xSiO_{(4-x)2}$$

where $x$ is a number between 0.5 and 1.5. In U.S. Patent No. 2,258,221, the aroxy silicones are stated to have the formula $R_2SiO$ where R is A—O—A′ and A is aryl and A′ is alkyl or aryl. In U.S. Patent No. 2,252,220, the silicone wherein one hydrocarbon radical is methyl and the other is aryl is stated to be a methyl aryl silicone or, specifically, methyl phenyl silicone.

Briefly, the silicon polymers are generally prepared by hydrolysis of a silicon compound of the formula $R_xSiCl_{(4-x)}$ where R is a hydrocarbon radical or hydrogen and where at least one R is hydrocarbon. The hydrolysis generally involves adding a solution of the silicon compound in an inert, organic liquid solvent to water, which may be at a temperature of from, say, about 5° C. to boiling, depending upon the nature of the individual silicon compound. The polymer, i.e., the silicone, generally precipitates out; however, if it is soluble in the solvent which has been used, it is readily obtained by removing the organic layer from the hydrolysis mixture and volatilizing off the solvent to leave the silicone as residue. Generally, the silicones are soft, rubbery materials rather than hard resinous products. Hardening or "curing" of the silicones generally takes place upon heating them at up to temperatures which may be as high as 550° F. Higher temperatures usually degrade them. Although the hydrolysis of the chloro-silicon compounds to the silicones and curing of the latter proceeds generally without the use of catalysts or curing agents, in attempts to attain specifically desired characteristics, catalysts and curing additives are often employed. Although a variety of materials are known in the art to serve as catalysts and/or curing agents, basic agents are commonly used, e.g., nonionic nitrogen bases, polyalkyleneamines, and compounds consisting of silicon and one or more amino radicals. Thus, in the Siegfried Nitzche Patent No. 3,032,528, (hydrocarbylamino)silanes are taught to be efficient curing agents for the silicones; in the Paul L. Brown U.S. Patent No. 3,170,894, compounds of the formula $$O[Si(CH_3)_2(CH_2)_nNH_2]_2$$

and $[CH_3SiCH_2Si(CH_2)_n]_2CHNH_2$ are taught to be catalysts for the co-condensation of silicones with silanes; and in the Ralph F. Sellers, U.S. Patent No. 3,068,199, aminoalkyl alkoxy silanes are used in the water hydrolysis of the chloro-silanes to the silicones.

Whether or not a catalyst and/or a curing agent is used in the preparation and/or hardening of the silicones is immaterial insofar as obtaining the benefits conferred to coatings produced by heat treatment of silicones in admixture with colloidal alumina and titanium dioxide as provided by the invention.

When R in the $R_xSiO_{(4-x)2}$ formula of the presently useful silicones is hydrocarbon the silicones are generally prepared by the hydrolysis of halosilanes of the formula $RSiCl_3$, $R_2SiCl_2$ or $R_3SiCl$. Depending upon the nature of the halosilane and the hydrolysis conditions, there are obtained either linear polymers, i.e., those in which the repeating unit is (I)
$$-O_{0.5}-\underset{R}{\overset{R}{\underset{|}{Si}}}-O_{0.5}-$$

or polymers in which some or all of the above units are cross-linked at the silicon, thus (II)
$$-O_{0.5}-\underset{R}{\overset{R}{\underset{|}{Si}}}-O_{0.5}-$$
$$\phantom{-O_{0.5}-}\overset{|}{O}$$
$$-O_{0.5}-\underset{R}{\overset{|}{\underset{|}{Si}}}-O_{0.5}-$$

For coating purposes, polysilicones consisting of both units (I) and (II) are generally used. The entirely cross-linked silicones, i.e., those consisting of only unit (II) are generally too insoluble to be useful in such applications; however, the presence of some cross-linked units tends to increase thermal resistance. Accordingly, silicone resins which contain enough cross-linked units to exhibit improved thermal property, but insufficient to affect adversely the solubility property have been provided. Since the extent of cross-linking determines the properties of the silicone resins, the resin compositions are generally expressed by the type of formula used in the Rochow U.S. Patent No. 2,258,220 referred to above (see also the Paul L. Brown, U.S. Patent Nos. 3,122,522 and 3,170,894; the Edwin P. Pluedemann, U.S. Patent No. 3,046,250; the S. D. Brewer Patent 3,135,713 and the Thomas L. Talcott U.S. Patent No. 3,065,201), wherein the extent of cross-linking is indicated by the ratio of hydrocarbon to the number of oxygen atoms present, since the cross-linking, if any, is through that oxygen which is not present in linear silicones. Thus in the formula $R_xSiO_{(4-x)2}$ as $x$ increases, the average number of oxygen atoms decrease. Conversely, as the number of oxygen atoms increase, the number of hydrocarbon atoms decrease. When $x$ is 2, there is present one oxygen atom per hydrocarbon radical. This is the situation in a polymer consisting entirely of the linear unit (I). When $x$ is 1, there are present 1.5 oxygen atoms per hydrocarbon radical. This is the situation in a polymer consisting entirely of the cross-linked unit (II). In three-dimensional or other very highly cross-linked polymers, $x$ can be less than 1. Silicones wherein $x$ is a value between 1 and 2 generally consist of units (I) and (II), the ratio thereof being indicated by the proximity of the value to either unit. Thus, a silicone wherein the value of $x$ is 1.5, consists about 50 percent of each of the two units. One in which $x$ has a value of 1.75 consists about 80% of the linear unit (I) and 20% of the cross-linked unit (II).

For the present purpose, there are employed silicone resins wherein the value of $x$ is from 1 to 1.80. Silicones having a value for $x$ within this range are generally soluble in volatilizable solvents; and according to this invention solutions thereof can be incorporated with certain large quantities of the hereinbefore described mixtures of alumina and titanium dioxide, applied to substrate, and heated upon the substrate at temperatures of up to 550° C. to form in situ, tightly bonded, highly heat-resistant coatings upon the substrate.

Also useful for the present purposes are silicone resins of the formula $R_xSiO_{(4-x)_2}$ wherein up to 60% of the R radicals are hydrogen, with the remainder of the R radicals being hydrocarbon. The hydrogen-containing silicones are prepared in known manner by hydrolyzing a hydrocarbyltrichlorosilane or a mixture of a dichlorodihydrocarbylsilane and a silicon-halogen compound in which hydrogen is attached to silicon, e.g., a dichloromono-hydrocarbylsilane or trichlorosilane, in the appropriate ratio to give a polysilicone in which some of the repeating units, but not more than commensurate with the above-stated 60 percent limitation, are:

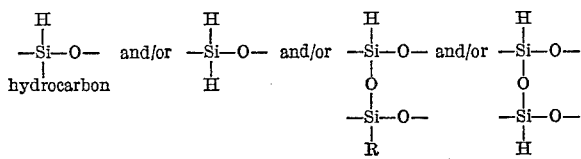

The hydrocarbyl radical in the silicones, whether or not they include one or all of the hydrogen-containing units shown above, may be any alkyl, alkenyl, cycloalkyl, aryl, alkaryl or aralkyl group which contains from 1 to 8 carbon atoms, e.g., it may be methyl, ethyl, vinyl, isopropyl, propyl, butyl, tert-butyl, pentyl, hexyl, heptyl, 2-ethylhexyl, octyl, cyclopentyl, cyclohexyl, dimethylcyclohexyl, phenyl, o-, m- or p-tolyl, o-, m- or p-ethylphenyl, xylyl, benzyl, 2-ethylphenyl, etc. The alkyl radicals need not be the same in the silicone molecule. As is shown in the art, halosilanes containing diverse hydrocarbyl radicals are readily hydrolyzed to give the silicone polymers, a readily available commercial silicone being that which is obtained by hydrolysis of dichloromethylphenylsilane to give a silicone including the unit:

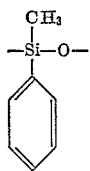

Also, as is well known in the art, silicones having a diversity of hydrocarbyl substituents are easily prepared by hydrolyzing a mixture of different hydrocarbon-substituted halo-silanes, e.g., a mixture of dichlorodiphenylsilane and dichlorodiethylsilane.

Although the commonly available silicones are those prepared from the dichlorodihydrocarbylsilanes, the invention also includes use of silicones prepared from other hydrocarbon-substituted halosilanes, e.g., the chlorotrihydrocarbylsilanes such as chlorotrimethylsilane or the hydrocarbyltrihalosilanes such as phenyltrichlorosilane, so long as the silicone product contains the hydrocarbon or hydrocarbon plus hydrogen relationship to oxygen content expressed in the formula $R_xSiO_{(4-x)_2}$.

The presently provided, very heat-resistant coatings are made by incorporating a solution of the silicone with the requisite quantities of the filler, i.e., the fibrous colloidal alumina and the comminuted titanium dioxide, applying the resulting composition to the substrate, removing the solvent, and heating the residue to from 370° C. to 550° C. to reduce the weight of the dried composition by from 10% to 30%. Incorporation of the silicone solution with the titanium dioxide and alumina may be effected simply by stirring. Advantageously, however, a high speed propeller mixer, a colloid mill or a ball mill is used. Easily applied sols and dispersions are thereby obtained, but it is advantageous to grind the solution with the pigments, e.g., in the ball mill. Thereby a fine dispersion is obtained. Although the quantity of filler may be from, say, 1.5 to 8.5 times the weight of the silicone, for most purposes, from 1.8 to 8.0 times the weight of the filler, based on the silicone, is preferred. Also, although the weight ratio of alumina to titanium dioxide may be from 1:5 to 3:2, i.e., the mixture of the alumina and the titanium dioxide may consist of from 15% to 60% of alumina, it is preferred to employ a weight ratio of the alumina to titanium dioxide of 1:3 to 1:1, i.e., a mixture of alumina and titanium dioxide consisting of from 25% to 50% of alumina.

The colloidal alumina may be used in substantially loose powder form; advantageously, it is the commercially available fibrous boehmite, i.e., colloidal alumina fibrils.

The titanium dioxide may be any of the finely comminuted products obtainable in commerce. A pigment-grade quality is preferred. It may be derived from any of the naturally-occurring titania minerals, e.g., anatase, brookite or rutile. Anatase titania is preferred. The solvent may be any volatilizable inert, organic liquid which dissolves the polymer at ordinary room temperature or upon heating. The lower alcohols, e.g., ethanol or isopropanol; the hydrocarbons such as hexane, benzene or xylene; the N,N-dialkylamides such as dimethylformamide, etc. Conveniently, the solvent may be that in which the silicone has been prepared.

Drying of the fluid composition upon the substrate may be done with or without heating, depending upon the ease of volatilization of the solvent. Generally, air-drying to set may be employed, particularly when evaporation of the solvent requires little, if any, application of heat.

Although subsequent heating involves the use of temperatures at which oxidative attack may be expected, the atmosphere in which heating at temperatures of up to 550° C. is conducted appears to be immaterial; i.e., it may be conducted in air or in an inert atmosphere which may be, e.g., nitrogen, argon or vacuum. Accordingly, in the more detailed examples which follow the heat treatments were conducted in air. Advantageously, the substrate with the dried coating deposited thereon, is subjected during a period of, say, from about one to five or six hours, to gradually increasing temperatures until a maximum of about 370° C. to 550° C. has been attained and heating is continued at the maximum temperature until there is substantial cessation of loss in weight. This continued exposure to the maximum curing temperature will be hereinafter referred to as aging. Depending upon the nature of the individual silicone, the proportion of filler to silicone and the ratio of alumina to titania, heating is conducted until a weight loss of from about 10% to about 30% has occurred. This point can be readily ascertained in experimental runs by noting substantial cessation of change in the appearance of the film. The final coating will generally be flat, continuous, adherent to the substrate, and hard enough to resist scratching with a soft pencil. Upon continued heating at the maximum curing temperature, say, an additional hour, there results substantially no detectable weight loss; however, prolonged heating under such conditions may result, in as much as a 2 to 3% decrease in coating weight over a period of, say, from about 8 to 12 hours.

Evaluation of the cured coating may be conducted at the temperature and in the atmosphere which are to be encountered in the contemplated use of the coated substrate. It is then inspected to determine the effect, if any, on adherence of the coating, its color, thickness and mechanical strength. Generally, further subjection of the in situ formed coating to the maximum temperature used in the heat-treatment has substantially no effect on the appearance of the coating, and the continuity, adherence and hardness of the film are substantially unchanged.

The coating is unique because, although it contains a very high ratio of the alumina-titanium dioxide mixture to organic material, it is nevertheless a strong, adherent film of substantial thickness. For example, when a fluid composition consisting essentially of a 66:33 weight ratio of filler to silicone plus solvent for the polymer, is applied to a metal substrate, dried to remove the solvent, and then heated on the substrate at up to about 540° C., the coating on the substrate may weigh about 20% less than it did after drying. The 20% loss in total weight represents a 40% loss in the weight of the polymer, since the inorganic material is not affected. Therefore, the heated coating now has about a 80:20 weight ratio of filler to pyrolyzed resin. As the ratio of filler to silicone in the fluid composition is increased, the percent loss of the silicone remains substantially constant; but since less of the silicone is initially present, percent loss of the total composition is less. Thus, starting with a 80:20 weight ratio of filler/silicone composition, heating to give a 10% weight loss of the composition results in 40% loss of silicone and a final coating having about an 88:12 weight ratio of filler to pyrolyzed resin. The percent loss in the weight of the original polymer will depend, of course, upon the nature of the silicone and upon the heating conditions.

The invention is further illustrated by, but not limited to, the following examples:

Example 1

A commercially obtained xylene solution of a silicone resin having a solid content of 50 weight percent, a viscosity of 100–200 cps. at 25° C. was used in this example. The resin contained phenyl and methyl radicals as hydrocarbon substituents at the silicon atom and conformed to the formula $R_xSiO_{(4-x)2}$ where $x$ is a value between 1 and 2, thus indicating some cross-linking. It had a high hydrocarbon/silicon ratio. The effect of titanium dioxide concentration on coatings obtained from this solution was studied as follows:

Respective dispersions were prepared, using 3.0 g. of the said resin solution, 6.0 g. of xylene, 4 drops of a conventional aminosilane catalyst

[NH$_2$CH$_2$CH$_2$NHCH$_2$CH$_2$CH$_2$Si(OCH$_3$)$_3$]

and the amounts of fibrous, colloidal alumina and pigment grade titanium dioxide shown below. Dispersing was conducted by grinding in a ball mill. Substrate strips of stainless steel were cleaned by scouring and rinsing with distilled water. The dispersions were respectively cast onto the cleaned strips using a 10 mil gage micro doctor knife. Test strips upon which there had been deposited dispersions containing the following quantities of alumina and titanium dioxide were thus prepared:

| Test strip No. | Al$_2$O$_3$, g. | TiO$_2$, g. | Total filler composition, percent | |
|---|---|---|---|---|
| | | | Al$_2$O$_3$ | TiO$_2$ |
| 1 | 0.03 | 2.85 | 1.05 | 98.95 |
| 2 | 0.15 | 2.73 | 5.2 | 94.8 |
| 3 | 0.29 | 2.59 | 10.0 | 90.0 |
| 4 | 0.72 | 2.16 | 25.0 | 75.0 |
| 5 | 1.44 | 1.44 | 50.0 | 50.0 |

The total quantity of filler, i.e., 2.88 grams, was the same in all of the above dispersions. Since the quantity of silicone present in the 3 g. of resin solution was 1.5 g. the concentration of total filler was thus 190% of the resin. Upon air-drying, the thickness of the deposits was substantially the same, i.e., about 2 mils. The strips with their deposits were then cured in air by heating to constant weight at 90° to 200° C. and then aged in air by maintaining them for 8 hours at 538° C. (1000° F.). The following results were obtained:

| | Film properties after aging | | | | | | |
|---|---|---|---|---|---|---|---|
| Strip No. | Thickness, mil | Filler concn., percent | | Gloss | Film integrity | Adhesion | Weight loss, percent |
| | | Al$_2$O$_3$ | TiO$_2$ | | | | |
| 1 | 0.4–0.8 | 0.9 | 84 | Eggshell | Flaked | Poor | 22.4 |
| 2 | 0.6 | 4 | 71 | ...do... | ...do... | ...do... | 18.4 |
| 3 | 1.4 | 8 | 74 | Flat | Cracked | ...do... | 19.6 |
| 4 | 1.8 | 20 | 60 | ...do... | Good | Good | 19 |
| 5 | 2.1 | 41.5 | 41.5 | ...do... | ...do... | ...do... | 21 |

The above weight losses were those determined by weighing before and after the heating treatment. They are based on the weight of the dry film, rather than on film plus substrate.

All of the coatings were white.

The above data show that when there are to be provided coatings having a thickness which is substantially over 1 mil, use of increased concentrations of the colloidal alumina with the titanium dioxide is very beneficial. Employing the same total quantity of filler, and increasing the alumina content thereof from 8% to 20% results in obtaining films which are neither flaked nor cracked and have good adhesion. In view of the fact that the percent total weight loss of all of the films is of about the same order, the substantial retention of film integrity by films containing the higher quantities of alumina can be ascribed only to participation by the alumina in the build-up of a very stable skeleton structure. This shows up in lack of cracking and flaking. The stabilizing effect of the alumina also shows up in adhesivity; lack of stresses and strains within the film is conducive to retention of the film by the substrate.

Example 2

In this example there was employed a lightly cross-linked silicone prepared by hydrolyzing a solution of 3.22 g. (0.025 mole) of dimethyldichlorosilane and 7.48 g. (0.050 mole) of methyltrichlorosilane in 42.5 ml. of ether in an ice water slurry, and removing the ether from the resulting organic phase.

A dispersion of the silicone was prepared by grinding in the ball mill a mixture consisting of 0.58 g. of the silicone, 4.20 g. of ethanol and 2.0 g. of a 1:3 weight ratio mixture of titanium dioxide and fibrous colloidal alumina. The weight ratio of silicone to filler is thus about 1:3.5 and the weight percent of filler in the solvent-free composition is about 78%. The dispersion was cast onto a clean strip of stainless steel, using a 3-mil gage micro doctor knife and the strip was air-dried. It was then cured at 140° C. and 200° C. during successive 4-hour periods at each of these temperatures. The cured film had a thickness of 0.5–0.7 mil. Weighing before and after curing showed a 1.6% weight loss in the film. It was then aged by maintaining it for 8 hours at 538° C. (1000° F.). The tightly adherent, white coating thus obtained had an egg-shell gloss. Aging did not change the film thickness. Loss in weight due to aging was 2.9% (overall weight loss, 5.9%). Althouh the aged coating film thus had a filler content of about 83%, it was of good integrity, being neither cracked nor flaked. It could be scratched by a hard pencil, but could not be scratched by a soft pencil or by a blunt instrument.

Although the above examples are limited to only stainless steel as the substrate, the invention is applicable to the coating of metals generally, e.g., iron and the various alloys thereof, aluminum, manganese, chromium, copper, beryllium, cobalt, titanium and heavy metals generally. The presently provided coating process is likewise suitable for the provision of tough and adherent, thermally stable, protective coatings for siliceous materials, including the ceramics and glasses and for carbonaceous materials such as graphite.

It is to be understood that although the invention has been described with specific reference to particular embodiments thereof, it is not to be so limited since changes and alterations therein may be made which are within the full intended scope of this invention as defined by the appended claims.

What is claimed is:

1. An in situ formed coating prepared by substantially uniformly applying to the surface of a solid metallic substrate a fluid composition consisting essentially of a mixture of a silicone polymer consisting essentially of groups represented by the formula
$$(R)_xSiO_{(4-x)2}$$
in which R is selected from the class consisting of hydrogen and hydrocarbon radicals of from 1 to 8 carbon atoms and wherein no more than about 60% of the R radicals are hydrogen and $x$ is a number of from 1.0 to 1.80, an inert, organic, liquid solvent for said polymer, and a filler in a quantity which is from 150% to 850% by weight of the polymer and which consists essentially of a finely comminuted mixture of colloidal fibrous alumina and titanium dioxide consisting by weight of from 15% to 60% of the alumina with the balance being titanium dioxide, evaporating off said diluent from said composition, and heating the composition remaining to above 370° C. and below 550° C. to decrease the weight of the remaining composition by from 10 to 30% and to obtain upon the substrate a strongly adherent in situ formed coating.

2. The coating defined in claim 1, further limited in that R is hydrocarbon.

3. The coating defined in claim 1, further limited in that R is alkyl.

4. The coating defined in claim 1, further limited in that R is methyl.

5. The coating defined in claim 1, further limited in that up to 60% of the R substituents are hydrogen, with the remaining being methyl.

6. The coating defined in claim 1, further limited in that the R substituents are methyl and phenyl.

7. The coating defined in Claim 1, further limited in that subsequent to evaporating the diluent, the composition is cured by gradually heating it to about 500° C. and then aged by heating at 500–550° C.

8. The coating defined in claim 1, further limited in that the substrate is stainless steel.

9. The process which comprises:
   (1) substantially uniformly applying to the surface of a refractory substrate a fluid composition consisting essentially of a mixture of a silicone polymer consisting essentially of groups represented by the formula:
   $$(R)_xXiO_{(4-x)2}$$
   in which R is selected from the class consisting of hydrogen and hydrocarbon radicals of 1 to 8 carbon atoms and wherein no more than about 60% of the R radicals are hydrogen and $x$ is a number of from 1.0 to 1.80, an enert, organic, liquid solvent for said polymer, and a filler in a quantity which is from 150% to 850% by weight of the polymer and which consists essentially of a finely comminuted mixture of colloidal fibrous alumina and titanium dioxide consisting by weight of from 15% to 60% of the alumina with the balance being titanium dioxide,
   (2) evaporating off said diluent from said composition, and
   (3) heating the composition remaining to above 370° C. and below 550° C. to decrease the weight of the remaining composition by from 10% to 30% and to obtain upon the substrate a strongly adherent in situ formed coating.

References Cited

UNITED STATES PATENTS

| | | | |
|---|---|---|---|
| 2,619,443 | 11/1952 | Robinson | 117—221 X |
| 2,915,475 | 12/1959 | Bugosh | 117—138 X |
| 3,364,065 | 1/1968 | Cutright | 117—161 X |

RALPH S. KENDALL, Primary Examiner

U.S. Cl. X.R.

117—137, 161; 260—37